April 5, 1955  R. M. SCHLABACH ET AL  2,705,346
METHOD OF WORKING PLASTIC
Filed Nov. 14, 1952
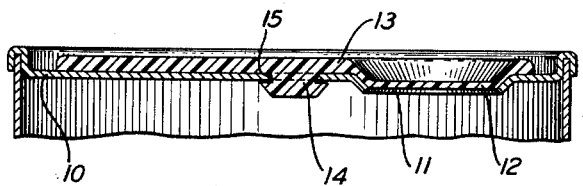
Fig.1
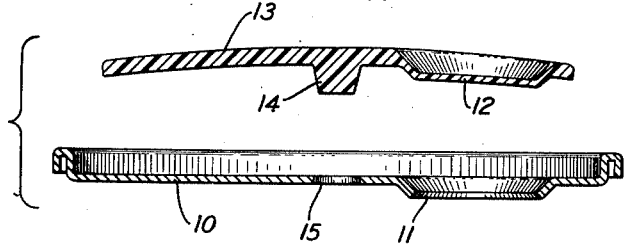
Fig.2
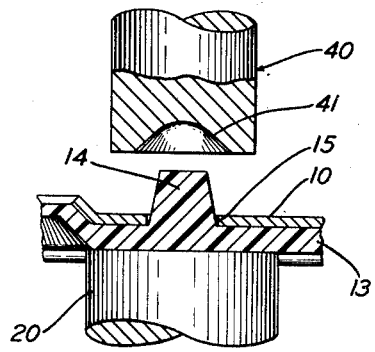
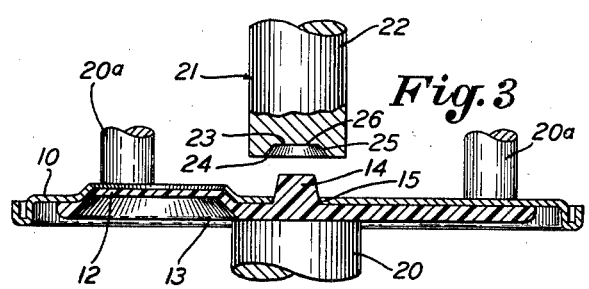
Fig.3
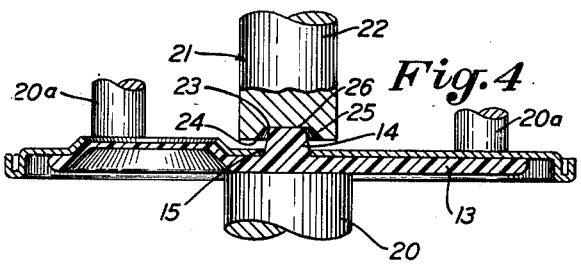
Fig.4
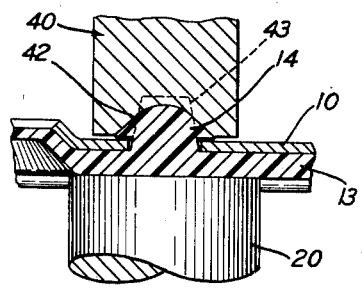
Fig.6
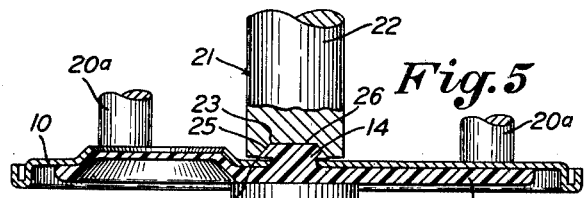
Fig.5
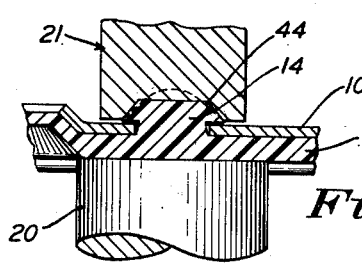
Fig.7
Fig.8
INVENTORS
Raymond M. Schlabach and
BY Louis V. Bockius
Frease & Bishop
ATTORNEYS

United States Patent Office 2,705,346
Patented Apr. 5, 1955

2,705,346

METHOD OF WORKING PLASTIC

Raymond M. Schlabach, Hills and Dales, Canton, and Louis V. Bockius, Congress Lake, Ohio Application November 14, 1952, Serial No. 320,546

1 Claim. (Cl. 18—59)

Our invention relates to a new and improved method of working plastic and more particularly to a method of attaching a plastic article to a supporting surface. Even more specifically our present invention is concerned with, but not limited to, a method of attaching a plastic article to a supporting surface in a manner to permit the article to rotate on the surface.

In the plastic working field there has been, to date, no method perfected for quickly and easily securing a plastic article to a supporting surface, without regard to the particular material from which the surface is formed.

Heretofore, numerous attempts have been made to utilize metallic fasteners such as pins, rivets, and the like as well as a wide assortment of adhesive materials to secure plastic articles on plastic, wood and metallic surfaces. All of these attempts have proved that there is no single method which is satisfactory and suitable as a general uniform and standard practice since each metallic or adhesive fastening is closely dependent on the type of plastic used as well as the particular material composing the surface to which the article is to be attached.

It is therefore a general object of the present invention to provide a method, or methods, which meet a long standing need in the plastic field, and to present a method which is particularly adaptable to securing plastic articles rotatably on a supporting surface, but which is equally advantageous in affixing a plastic article rigidly to such a surface. Further, the instant invention satisfies the requirements of all the general working characteristics of substantially all known plastics and of their general actions and reactions under many and varied working conditions. Therefore, a method of working plastic is provided which satisfies the requirements not only of the materials to be used but of the jobs to be done.

Another object of the present invention resides in the provision of a new and improved method for working plastic which readily permits a plastic article to be securely yet rotatably attached to a supporting surface.

Still another and important object of the instant invention lies in the provision of a method of working plastic which permits of exacting adjustment and minute control of plastic flow and of resulting tolerances in the changing of the configurations of the original plastic pieces.

Another object of the present invention is provided by a method of working plastic which is capable of practice in any one of several combinations of different procedural steps and under varied conditions thus rendering the method readily capable of modification to meet the varied requirements of different jobs to be done.

Still a further object of the instant invention is the provision of a method of working plastic which is readily adaptable in any of its varied refinements to assembly line use in assembly line production of constructions which include a plastic article affixed to a supporting surface.

Still another and most important feature of the present invention is that which permits of the working of plastic by a method which is extremely simple and economical in its practice and which results in a durable and long lasting construction.

These and other objects are accomplished by the steps, processes, and methods comprising the general characteristics of the present invention, preferred embodiments of which are illustrated in the accompanying drawings and described in the specification as exemplifying the best modes of practicing the invention, the nature of the improvements being set forth in the following general statement, and the scope of the invention being defined in the appended claim.

In general terms, the invention comprises a method of working plastic to permit a plastic article to be secured either rigidly or rotatably to a supporting surface by the utilization of a simple tool arrangement working upon a simple plastic construction by the selective and interchangeable application of heat, compression, rotation, and cold.

Referring to the drawings, in which preferred embodiments of the present method are shown by way of example;

Figure 1 is a partial vertical section showing a plastic article secured by the present methods to a supporting surface;

Fig. 2 is a sectional assembly view of the article and the supporting surface prior to their assembly;

Fig. 3 is a partial vertical section generally illustrating the first step of the working method;

Fig. 4 is a partial vertical section generally illustrating the second step of the working method;

Fig. 5 is a partial vertical section generally illustrating the final step of the general working method;

Fig. 6 is a partial vertical section generally illustrating the first step in a modified method of practicing the invention;

Fig. 7 generally illustrates the second step in the modified practice; and

Fig. 8 generally illustrates the final step in the modified practice.

Similar numerals refer to similar parts throughout the several views of the drawing.

Referring now to the drawings in particular there is disclosed in Figs. 1 and 2 an illustrative embodiment of the application and result of the basic method constituting the instant invention. In this embodiment there is shown a can closure construction, which forms the basic disclosure of a companion application for U. S. Letters Patent, including an annular container wall 10 provided eccentrically of its axial center with a dispensing opening 11. A plug member 12 shaped to conform with the opening 11 is carried on an elongated plastic bar element 13 which is slightly bowed along its length and rotatably secured on the face of the annular wall to position the plug member 12 radially of its attachment so as to bring it into closing registry with the opening 11 upon rotation of the bar element 13.

The manner in which the bar element 13 is secured to the annular wall 10 consists in providing an extended, slightly tapered shank element 14 on the bar element 13; such shank being formed integrally with the plastic bar element at the time the bar is formed. The extruded shank 14 is rotatably positioned in a circular hole 15 formed in the annular wall 10, and then an enlarged, button head is formed on that end of the shank extending behind and beyond the wall to securely attach the bar rotatably on the wall.

In the foregoing construction it is the basic method for forming the enlarged head on the plastic shank which forms the primary embodiment of the instant invention.

It should be readily apparent to anyone skilled in the plastic arts that the type of attachment used in rotatably securing the bar element 13 to the annular wall 10 in the construction described above is merely illustrative of many thousands of similar applications, in as many diversified constructions, of the method, or methods, which we claim broadly as a novel and extremely useful discovery in plastic working.

Throughout Figs. 3 through 8 of the drawings there are disclosed various procedural steps which may be employed in practicing our novel method of working plastic. There is disclosed in these Figs. 3 through 8 a basic embodiment of our method as well as varied steps which can be selectively used to modify the basic method to meet requirements peculiar to different requirements of construction or manufacturing techniques.

We will hereinafter describe the basic concept of our novel plastic working method, and then we will progressively describe, with reference to the detailed drawings, each successive modification of our method which may be selectively practiced to meet the needs of the particular job to be done. It should be noted that in the descriptions to follow we have utilized a construction as shown in Figs. 1 and 2 and described above merely for the purpose of more clearly disclosing our invention, and such illustration is not to be construed in any way as a limitation of our invention or its application.

Method 1

The basic concept of the present invention embodies the forming of any plastic article, which is to be subsequently attached to and supported on a supporting surface, with an extending shank portion originating on that face of the article to be supported adjacent the support surface. This shank portion is to be formed, at the time of the formation of the plastic article, of a length in excess of the thickness of the member on which the article is to be supported and with a slight diametrical taper throughout its length.

The member on which the article is to be supported is provided with an aperture adapted to receive the shank in projection therethrough.

When it is required, or desirable, that the article be capable of rotation on the supporting surface, it is necessary that the shank and the aperture be circular. However, if rotation of the article is not required or desired, then any triangular, square, polygonal or other non-circular configuration of the shank and/or aperture may be utilized.

After the article has been formed with the shank and the aperture has been formed in the supporting surface, the shank is positioned on the surface with the shank projecting through the aperture to extend for a spaced distance beyond the back of the surface.

A backing member or support, generally indicated at 20, is positioned to abut against that portion of the plastic article immediately opposed to the shank 14. Holddown members, generally indicated at 20a, maintain the bowed bar flatwise against the annular surface 10, as shown in Fig. 3, and the backing member 20 cooperates therewith to properly position the parts and to back up the tool operation to be hereinafter described.

The operation of forming an enlarged button head on the shank 14 behind the surface 10 consists in compressing the shank axially of its length from its free extremity toward its origin on the plastic article, with such compression being accompanied by a restrictive confinement of the shank within an enclosed area of substantially identical configuration with that desired for the button head in its finished form.

The desired compression and shaping of the shank is accomplished with a tool member, generally indicated at 21, which includes an elongated stem 22 positioned in axial alignment above the shank, provided with a recess 23 in the flat lower end thereof. The recess 23 consists of a circular opening 24 formed with upwardly and inwardly inclined walls 25 which terminate in a flat circular face 26 forming the inner extremity of the recess which is concentric with the outer opening 24.

The outer circular opening 24 of the tool recess 23 is of a predetermined diameter substantially greater than that of the aperture 15 in the annular wall 10, while the diameter of the inner end wall 26 of the recess 23 is substantially greater than the diameter of the outer extremity of the tapered shank 14.

Accordingly, when the tool is moved down to engage the shank, the inner end face 26 of the recess 23 will engage and abut the end of the shank concentrically thereof as shown in Fig. 4. Then, with an application of pressure on the tool downward of the shank, the shank end will mushroom outwardly and downwardly within the confines of the tool recess.

By pre-gauging the length of the downward stroke of the tool 21 the downward flow of material from the compressed shank will be caused to terminate at a predetermined distance from the rear face of the supporting surface, as indicated at 30, in order to provide sufficient clearance between the enlarged shank and the supporting surface to permit rotation of the article and shank.

However, it being a commonly known fact that most of the plastics which would be utilized in a construction subject to manufacture or assembly by these methods have a physical characteristic of a somewhat slippery or self-lubricating surface which permits easy rotation of such a plastic upon a metallic, wood or other plastic surface while in close frictional engagement therewith. Accordingly, the clearance provided for between the underside of the enlarged head formed on the shank and the supporting surface is not of necessity of any substantial amount, but the control of the downward stroke of the tool within predetermined limitations prevents undue binding of the underside of the head against the face of the surface.

When rotation of the article is not a desired condition, then the length of the tool stroke may be increased in order to cause the compressed shank to flow downwardly so that the underside of the formed head will engage and bind on the rear face of the surface.

As an end result of the compression operation, the enlarged head will conform to the general configuration of the tool recess 23 as is clearly shown in Fig. 5 of the drawings.

From the resultant construction shown in Fig. 5, it is readily evident that the plastic article 13 is securely, and, when desirable, rotatably fastened to the supporting surface 10 by means of the method described.

This basic method of working a plastic article as has been described above has been found very applicable and successful when the plastic material utilized in the formation of the subject plastic article is of such a nature that will permit of a flowing or mushrooming of the plastic at normal working temperatures or at the slightly advanced temperature which will be induced into the plastic shank with compression thereof by the tool. However, there are many compositions of plastic the characteristics of which are not such as to permit a cold compression thereof, and accordingly there have been other methods, which will be hereinafter set forth, found to be more suitable, dependent upon the exact quantity and characteristics of the plastic used.

Method 2

Where the plastic material used is of such a character that normal working temperatures, or the slightly advanced temperature caused by compression, will not suffice to permit the material to flow and mushroom as is required, then it is necessary to apply heat during the compression operation from an external source. This external application of heat can be done in any one of a number of methods, but it has been found most advantageous to develop the heat in the tool itself which permits a more accurate control over the temperature and also permits of a direct application of the heat through the tool to that portion of the shank under immediate compression by reason of its contact with the tool.

This external application of heat as has been described constitutes the only variation in the second method of working the plastic in the manner desired over the concept of Method No. 1 which has been set forth above.

Method 3

A second variation from the original method as described would include in addition to the application of heat from an external source through the tool, an operation wherein the tool will be continuously rotated during the compression operation.

The speed of rotation of the tool will, in each instance, depend upon the particular plastic being worked, but in all cases it has been found that rotation of the tool, which produces what is known as a spinning operation, increases the rapidity of the compression and provides for a more uniform flow of the material under compression and hence a more perfectly formed enlargement on the shank.

Method 4

The third variation in the initially described and basic method constituting the primary invention herein consists in the use of a second tool identical in all respects to the first tool described and shown at 21, wherein the second tool is a cold or chilled tool which is applied to the head after its formation for the purpose of chilling the enlarged head to quickly set the plastic in its new formation. This speeds the cooling of the head and eliminates any possible natural flow or deformation of the head once it has been formed and prior to the time that it would cool at normal room temperature.

This application of a chilled or cooled tool as a second operational step in either Method 2 or 3 is very easily provided for in a production line operation wherein it would only be required that the assembled construction, as shown in Fig. 5, be transferred from one station in the assembly line to a second similar station where the cooled tool would be applied to the head formation before the article went into the discharge line.

*Method 5*

The fourth variation over the basic principal method and heretofore described constitutes an extremely novel discovery in the plastic working field.

In the present method the article and the supporting surface are assembled in the usual manner as shown in Fig. 3 and a tool of the same construction as tool 21 is used to complete the operational steps as pictured in Figs. 4 and 5.

However, in the present method the tool 21 is maintained generally at room temperatures and is rigged as a spinning tool whereby it is rotating at a predetermined speed throughout the steps of the forming operation.

When the tool is moved to its engaging position with the shank, as shown in Fig. 4, the heat developed by the frictional contact made between the stationary shank and the rotating tool will heat up the shank portion sufficiently to bring the plastic to a state of plasticity sufficient to permit it to flow and mush-room under the compression of the tool. Since the tool is in constant engagement with the shank throughout the compression stroke of the tool, and due to the fact that the tool is constantly spinning throughout this compression stroke, heat will be maintained in the shank by the frictional contact of the tool with the shank and thereby maintain the shank in a plastic state sufficient to permit the entire compression and shaping operation of the shank to be completed in the one stroke operation of the tool.

*Method 6*

The sixth method, constituting basically a modification of Method 5, includes in addition to the spinning and compression formation of the head as described in Method 5 a second step operation wherein the assembled construction is moved to a second station at which point a tool, either rotating or idle, is moved downwardly to engage the formed head. This second station tool is heated and provided with a recess of identical shape and size as the recess 23 in the first station tool. The contact of the second station tool serves by reason of its heated condition to more perfectly shape and smooth out the finished surfaces of the enlarged button head.

Again, after this second station shaping operation it would be possible to move the assembled construction to still a third station at which point a cold setting tool, of the type described in Method 4, could be utilized.

*Method 7*

The instant method constitutes a greater variation from the basic method set forth than have any of the other described heretofore and constitutes primarily a two or three stage shaping operation.

In this modified method a first station tool, such as is generally indicated at 40 in Fig. 6, is applied to the shank to initially shape the shank. This tool 40 carries a hemispherical recess 41 opening upwardly at its lower end and having an outside diameter substantially greater than the diameter of the aperture 15. When this tool 40 is moved downwardly into contact with the shank 14 to compress the same, as indicated in Fig. 7, a head having a hemispherical configuration is formed on the shank. Such a configuration is indicated at 42 in Fig. 7. The change in configuration from the original shank shape is illustrated in dotted lines in the same figure at 43.

In the second station step of this modified method the tool 21 is again utilized engaging the preformed hemispherical head to finally shape such preformed configuration into the finally shaped head as indicated at 44 in Fig. 8, such configuration being identical with that obtained in the other methods described.

From the disclosures of the foregoing methods it would appear obvious that the tools 40 and 21 respectively of this Method 7 could be spinning tools or could be heated compression tools, or any combination of such tools as proved to be the most satisfactory for the particular job to be accomplished. Likewise, it would, in view of the disclosures made heretofore, be an obvious expedient to use a third station chilled tool of the same construction as tool 21 in order to set the finally formed head.

From the disclosures and description of the foregoing methods in any one of their alternative formation it becomes readily apparent that a new method, or methods, of working plastic are herein provided which are quick and easy in application; which are economical in producing a durable and lasting construction; and which are readily adaptable to assembly line mass production.

Further, it becomes readily apparent that the methods disclosed in the foregoing provides a new and novel means for working plastic to accomplish a result often desired in the plastic art but never heretofore provided for by any adequate and successful method which has been of universal application regardless of the type of plastic used or of the particular material to which the plastic article is to be attached.

In addition, it is likewise apparent that the novel method, or methods, disclosed herein and forming the primary embodiments of the instant invention are subject to inexpensive practice in an assembly line construction of substantially any article or articles desired to be assembled by the instant method.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention, the construction, the operation and use of preferred embodiments thereof, and the advantageous new and useful results obtained thereby; the new and useful methods and constructions, and reasonable mechanical equivalents thereof obvious to those skilled in the art, are set forth in the appended claim.

We claim:

The method of rotatably attaching a bar-like plastic article to a wall member which includes, forming a longitudinally-bowed bar-like plastic article with an integral laterally extending tapered shank portion circular in cross-section, forming a circular opening in the wall member, placing the bowed article against one surface of the wall member and inserting the circular tapered shank in said opening with the shank extending through the opening and projecting beyond the other surface of the wall member, holding the bowed bar-like article flatwise against said one surface of the wall member, and shaping the projecting tapered shank portion only of the so-held bowed article to enlarged button-head shape of greater diameter than the diameter of said opening by simultaneously applying heat and axial pressure to the projecting shank portion to reduce the length and expand the diameter thereof with the tapered shank portion extending through the circular opening in the wall member remaining rotatable therewith.

References Cited in the file of this patent

UNITED STATES PATENTS

| | | |
|---|---|---|
| 2,033,042 | Mazzella | Mar. 3, 1936 |
| 2,169,315 | Yngve | Aug. 15, 1939 |
| 2,175,198 | Klein | Oct. 10, 1939 |
| 2,211,102 | Davis | Aug. 13, 1940 |
| 2,366,274 | Luth | Jan. 2, 1945 |
| 2,470,963 | Weyl | May 24, 1949 |